United States Patent [19]

Gottschalk

[11] Patent Number: 5,010,640

[45] Date of Patent: Apr. 30, 1991

[54] METHOD FOR IMPROVING A WIGGLER

[75] Inventor: Stephen C. Gottschalk, Woodinville, Wash.

[73] Assignee: Amoco Corporation, Chicatgo, Ill.

[21] Appl. No.: 383,743

[22] Filed: Jul. 21, 1989

[51] Int. Cl.⁵ ............................................. H01F 7/06
[52] U.S. Cl. .................................. 29/602.1; 335/306; 372/2
[58] Field of Search .................. 29/602.1; 328/235; 313/359.1, 361.1; 335/306; 372/2

[56] References Cited

U.S. PATENT DOCUMENTS

| | | | |
|---|---|---|---|
| 3,375,452 | 3/1968 | Forsyth | 328/235 |
| 4,461,004 | 7/1984 | Madey | 372/2 |
| 4,543,655 | 9/1985 | Condell, Jr. | 372/2 |

Primary Examiner—P. W. Echols
Attorney, Agent, or Firm—Seed and Berry

[57] ABSTRACT

Deviations between the actual electromagnetic field induced by a wiggler and a desired induced field are computed. Then the effect of adding shims at each position within the wiggler are determined and thicknesses of appropriate shims calculated to reduce the overall error of the resulting induced magnetic field from the desired magnetic field.

5 Claims, 1 Drawing Sheet

METHOD FOR IMPROVING A WIGGLER

DESCRIPTION

1. Technical Field

This invention is a method for improving a wiggler, and more particularly, a method for reducing the errors of a wiggler by appropriately adding shims to the wiggler.

2. Background of the Invention

A wiggler is a magnetic structure which is used to create a nearly sinusoidal magnetic field. In an ideal wiggler, this magnetic field is a perfect sine wave over the length of the wiggler. Wigglers are used either as sources of coherent synchrotron radiation or as gain media for a free electron laser (FEL). In both applications the wiggler causes the electron to follow a sinusoidal trajectory.

The electron trajectory through the wiggler is found by integrating the Lorentz force equation. From the electron trajectories, it is possible to derive several quantities of interest. One is the electron path length which controls the phase of the electron relative to a co-propagating light wave in an FEL. Another is the angular divergence of the electrons, which controls effective energy spread in an FEL and spectral quality in synchrotrons. Another quantity is the actual electron beam path, which affects the electron beam-photobeam overlap in an FEL, and emittance growth/coherence length in a synchrotron.

For a particular application, one or more of these quantities are of importance. By suitably designating the quantity which is to be minimized, it is possible to optimize the wiggler performance in this particular application. In the following detailed description, the particular example will be that of controlling high spatial frequency angular errors.

When used for synchrotron radiation, the goal of a wiggler designer is to create coherent radiation by causing the synchrotron radiation emitted by the electron during each period of its trajectory to add up coherently. In this manner, high fluxes are created at discrete wavelengths with narrow line shapes. Since an actual wiggler always has an imperfect magnetic field, the real radiation will have less coherence, some loss of radiation flux, and a broader line shape, as shown by B. M. Kincaid, in the Journal of the Optical Society of America, B:1294 (1985).

The key quantities of concern to a wiggler designer are electron beam walkoff due to an overall trajectory error and local angular errors in each half period of the wiggler field. Trajectory errors are the major reason for loss of performance. Shims are used to rearrange the field of errors into a low-spatial frequency so that the trajectory error is easily corrected by a steering corrector in front of the wiggler. Even if there is no net trajectory error, there is still loss of performance due to local half-period errors, primarily in the higher harmonics of the fundamental frequency. Shims reduce the integrated half-period errors (hereinafter called "kicks"), thereby minimizing this source of degradation. The kicks can be corrected by adding thin iron shims to the poles and/or the magnets.

Magnet shimming cannot modify the net angular deflection of the electron beam since the shims do not steer the electron beam. However, shimming does redistribute the high spatial frequency pole-to-pole angular errors into a low spatial frequency (constant) error which is then easily removed by other means.

In a free electron laser, the gain of the laser comes about from the interaction of the electromagnetic field of the laser beam with the sinusoidal electron motion. A portion of the electrons in the beam are decelerated in the wiggler and give up their energy to the co-propagating light wave, which causes the laser gain.

As is the case for synchrotron radiation, there are two major sources of gain degradation, trajectory errors and phase errors. Trajectory errors degrade the gain when the electron beam loses overlap with the optical beam, or the angular spread of the beam causes a significant portion of the beam to lose resonance. As is also the case for synchrotron radiation, shims reorganize field errors so that trajectory errors are easily and simply corrected. The portion of local field errors which do not steer the e-beam can still cause a loss of gain by causing the electrons to go out of phase with the light wave.

Ideally, one wave of the light should pass over the electron when it moves through one period of the wiggler magnetic field. If local field errors lengthen the electron's path, then this resonance condition will not be met. Shims make corrections to the local magnetic field, thereby reducing phase errors.

While both FEL and synchrotron applications require good field quality, the FEL is the more stringent. Typical wigglers achieve approximately one percent errors, but FELs require errors on the order of 0.25 percent.

There is no prior art for shimming wigglers with soft magnetic materials on the wiggler magnets. Previous attempts to improve Rare Earth Permanent Magnet (REPM) wigglers have been of two types: swapping (as reported by A. D. Cox and B. P. Youngman, in SPIE 582:91-97, International Conference on Insertion Devices for Synchrotron Sources (1985)); and adding magnets at the side (as reported by R. W. Warren, in the 9th International Free Electron Laser Conference, 1987).

Methods for improving hybrid wigglers include pole-magnet module swapping (as reported by B. M. Kincaid in the Proceedings of the Conference on Undulator Magnets for Synchrotron Radiation and Free Electron Lasers, Trieste, Italy, June 23-26, 1987), backplane shunting of poles (as reported by K. Halbach, SPIE 582:68-69, International Conference on Insertion Devices for Synchrotron Sources, 1985), and grinding poles (also reported by Halbach, above).

For REPM wigglers the simulated annealing technique has been used (as reported by Cox and Youngman, above). This is a sophisticated numerical sorting algorithm. Initially, the algorithm allows large field fluctuations in order to facilitate finding a nearly global optimum, then the magnets get gradually "frozen" into their final arrangement. There are a number of limitations to this method. The major one is that the final field quality is limited by the original set of magnets. Magnet swaps move an effect from one region to another. There is no possibility to effect a continuous change. The algorithm's job is to find an arrangement in which a large positive error is followed by an equally large negative error. Shimming actually reduces or eliminates the error.

As reported by Cox and Youngman, the simulated annealing cannot find a magnet configuration which numerically eliminates field errors. Numerically, shimming can totally eliminate local errors by redistributing them into a single constant (dipole) error. This is easily removed by applying a dipole field.

Warren, in his reference noted above, describes a method which uses small side magnets to add small corrections to the wiggler. Fabrication is a major issue with the approach described by Warren. On the other hand, Warren's method can eliminate field errors. Both methods are only applicable to REPM wigglers since they both require that the magnetic field from the individual magnets be superimposed.

For hybrid wigglers, Kincaid has used a simpler swapping technique. This involves swapping half-period, magnet-pole modules The method does a manual sort (i.e., without a computer optimizer) to move the largest negative errors next to the largest positive errors. The field is remeasured and another set of module swaps are made. Since the field errors in hybrids are not simply a superimposition of half-period errors, the iteration step is absolutely necessary.

This swapping method has all the disadvantages of simulated annealing. In addition, since assembly and disassembly of modules always involves some mechanical error and some portion of wiggler errors are due to mechanical errors, a point will be reached where the residual mechanical errors are controlling the field quality. I have experience with swapping individual magnets and poles (see, for example, S. Gottschalk, 9th International Free Electron Laser Conference, 1987), using an approach that is more flexible than half-period module swapping, but is still very time-consuming with no guarantee of convergence. Both swapping methods require special fixturing to allow wiggler disassembly and reassembly.

The shunting method of Halbach, described in the above-referenced article, uses soft magnetic material at the back of the wiggler (i.e., the portion farthest from the wiggler). This method has two drawbacks. The first is that it uses the leakage flux to control the main magnetic field. This flux has a very indirect and nonlinear effect on the main field. In addition, since this uses a magnetic backplane, the effect of shunting one pole spreads over many poles and does not superimpose with that of a shunt at another pole. Thus, neither linearity or superimposition are achieved.

To the inventor's knowledge, the method of grinding poles, described by Halbach, has never been implemented. It is an irreversible operation which also requires wiggler disassembly and reassembly.

In shimming, soft magnetic materials (such as iron) are placed in contact with a wiggler magnet near the e-beam. This concentrates the correction where it is most effective. This iron modifies the magnetic field of the wiggler. The nature of this modification can be analyzed and/or measured. The modified magnetic field will have different field errors. While the specific application uses shims placed on the magnets, an equivalent, but different in its details, effect can be achieved by placing shims on the poles.

Shims can also be used to improve the magnetic field of a wiggler by controlling the higher order moments. The magnetic field of a wiggler may contain additional field errors in the transverse plane (x,y) of a beam moving along the z axis. The transverse field dependence can be described by a polynomial expansion or equivalently a moment expansion. The moment expansion is used for analysis since each moment polynomial satisfies Maxwell's equations. Each moment has a particular transverse dependance, say x, y, xy, or $(x^2-y^2)$. The magnitude of the expansion coefficient affects the performance of a wiggler as an FEL or synchrotron radiation source. Again, due to wiggler imperfections, it is desirable to be able to control these higher order moments. This can be done by placing appropriately shaped shims on either the poles or magnets of the wiggler.

There are cases where a given wiggler is designed to achieve a particular transverse spatial dependence. One example is the use of canted poles as described by K. D. Robinson in *IEEE Journal of Quantum Electronics*, vol. QE-23, number 9, pp. 1497–1513, 1987. This pole shape achieves a linear transverse field dependence. Another example is the use of curved poles to achieve an $(x^2-y^2)$ field dependence, as described by E. T. Scharlemann, in the *Journal of Applied Physics*, 58(6), Sept. 15, 1985. In these examples it might be advantageous to use shaped shims placed on magnets not poles since the poles are already shaped for a particular higher order moment.

The kicks which have been described are due to magnetic field errors in the main component of the magnetic field, directed between the poles. There are two other components. The axial field is along the direction of the e-beam and the transverse component is orthogonal to the main and axial fields. The transverse field deflects the e-beam, as does the main field, so it should be corrected. This can be done by using shaped shims placed on magnets or poles. For a relativistic e-beam the axial field controls the betatron motion of the electrons. The steering errors in the main or transverse field do not effect the axial field. Higher order moments with a nonzero trajectory integral and a zero line integral do effect the axial field. If these higher order moments have been controlled, then from Maxwell's equations it follows that the axial field is controlled as well. Thus, by placing shaped shims on magnets/poles we can control the transverse field, higher order moments and the axial field errors.

The only method known to me for correcting either the transverse field or the higher order moments uses electromagnetic correction coils. In a hybrid or REPM wiggler the correction coil method cannot correct field errors whose line integral is zero but whose integral along the sinusoidal electron trajectory is nonzero. An example of the latter case is the field created by the curved poles of Scharlemann. Its line integral is zero, but its trajectory integral is nonzero. Its trajectory integral is carefully adjusted to achieve equal two-plane focusing and minimize the synchrotron-betatron resonance. By adjusting the shape of the shims and the phasing of the shapes it is possible to create shim fields whose trajectory and/or line integrals are nonzero.

DISCLOSURE OF THE INVENTION

It is an object of the present invention to provide a method for improving the field characteristics of a wiggler.

It is a further object of the present invention to provide a method for improving the field characteristics of a wiggler without requiring disassembly of the wiggler.

It is yet another object of the present invention to provide a method for improving the field characteristics of a wiggler for use with shimming materials having differing properties.

It is a still further object of the present invention to provide a method for improving the end fields of a wiggler.

Since all prior methods are sorting algorithms, they suffer from the same set of general deficiencies. Sorting algorithms do not allow continuous and arbitrary error tuning in the shim design. In contrast, the method of the present invention is not limited in its tuning range, does not require superposition, converges (since each iteration improves the field), does not require disassembly of the wiggler, and can be used on any wiggler design.

According to one aspect, the invention is a method for producing an n-pole wiggler by modifying an n-pole wiggler so that the modified n-pole wiggler has a desired longitudinal magnitude field. The method comprises the steps of measuring the individual effect on the magnetic field of the existing n-pole wiggler caused by adding an individual shim of known thickness to a first of the n-pole pieces of the existing n-pole wiggler. The method further comprises the step of measuring the individual effects on the magnetic field of the existing n-pole wiggler of separately adding individual shims of known thickness to each of the remaining n-pole pieces of the existing n-pole wiggler. In addition, the method comprises the step of computing the effect on the magnetic field of the existing n-pole wiggler of modifying the existing n-pole wiggler by simultaneously adding all of the shims to the corresponding n-pole pieces of the wiggler. Further, the method includes the step of adjusting the thicknesses of the individual shims to minimize the difference between the magnetic field of the desired wiggler and the actual magnetic field of the modified wiggler. Finally, the method comprises the step of adding shims having a desired thickness to the existing wiggler.

BEST MODES FOR CARRYING OUT THE INVENTION

The case of placing shims on magnets is described in the following detailed description of the invention, it being understood that the shims could alternatively be added to the poles. This method was used because the particular wiggler to be described did not have space for shims placed on pole pieces. The use of shims on magnets is actually more complicated to implement than shims on poles. Both methods use the concept of measuring the effect of shims, using the measured effect to predict the shim thicknesses, then placing the shims and remeasuring to verify. An iteration step is optional for both methods.

When shims are placed on poles they make a correction to the gap at that pole. This causes the local magnetic field to become stronger, causing a net angular deflection of the electron beam. The modification is essentially localized to a single pole, so shimming with iron on the poles is a very simple process. Since the shim effect is almost a delta function, determination of the shim thickness would be a trivial matter. The thickness would just be the measured kick divided by the kick per mil of shim. Since there is a small tail to the pole shim's effect, it may be necessary to iterate the process when a computer is not used. The iteration step would probably be unnecessary if the full effect of a shim is used in a computer optimization. This method does not require the use of external, low spatial frequency correctors to remove the net angular deflection of the beam. There is still the need for real time adjustable steering correctors to correct for any mismatched entrance conditions of the e-beam as it enters the wiggler.

Figure 1:
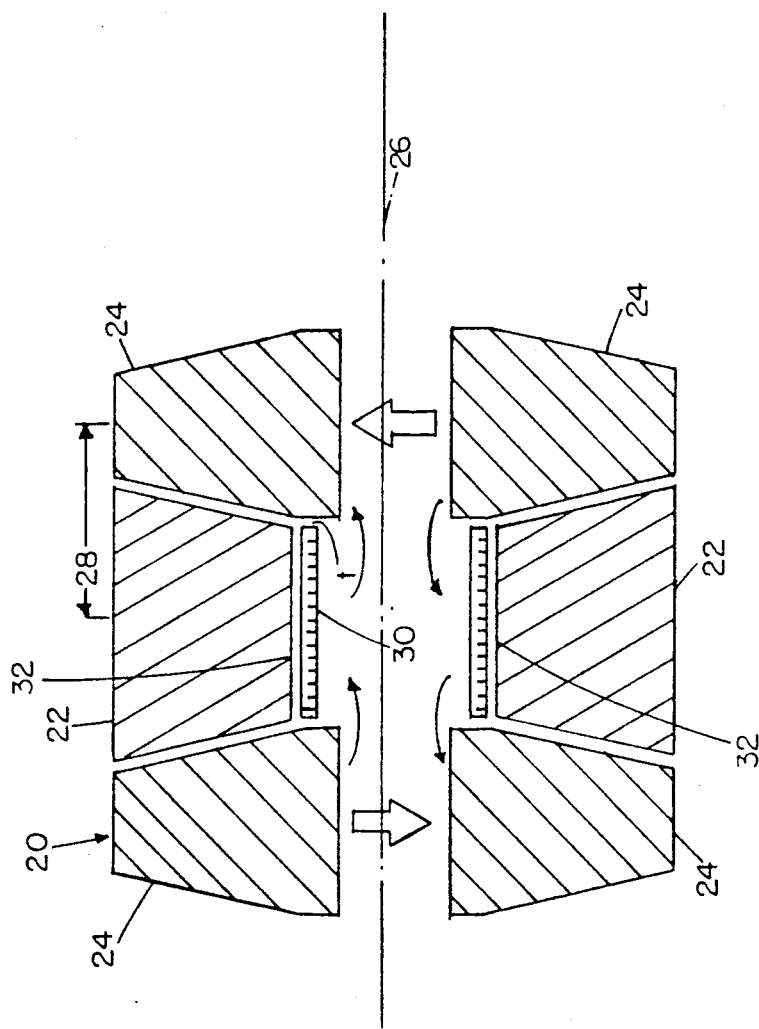
FIG. 1 is a schematic longitudinal cross-sectional view of a portion of a conventional wiggler.

A portion of a typical wiggler is shown in FIG. 1. The wiggler 20 is an array of magnets 22 and sometimes poles 24, disposed along an axis 26. The beam of electrons which generate the radiation of the free electron laser are moving along the axis 26. It is desirable that the wiggler causes the electrons to follow this axis.

The half period, indicated by the distance 28 of the wiggler 20, is defined to be the longitudinal distance between a transverse midpoint on a magnet 22 and a transverse point midway between consecutive magnets 22 positioned along the axis 26.

Pairs of the magnets 22 oppose one another with respect to the axis 26. They produce a magnetic field which, ideally, should vary as a sinusoidal wave along the axis 26. In a hybrid, the poles 24 are placed between consecutive magnets 22 to enhance the strength of the magnetic field along the axis 26.

Mechanical tolerances, variations in the magnetic properties of the materials of the magnets 22 and possibly the poles 24, cause the magnetic field along the axis 26 to deviate from its desired sinusoidal form. Accordingly, the field is corrected by the addition of shims 30 positioned at the faces 32 of the magnets 22. The field within the two half periods shown in FIG. 1 can be adjusted by the addition of the shims 30. It is desirable that the shims 30 be as magnetically identical as possible.

Figure 2:
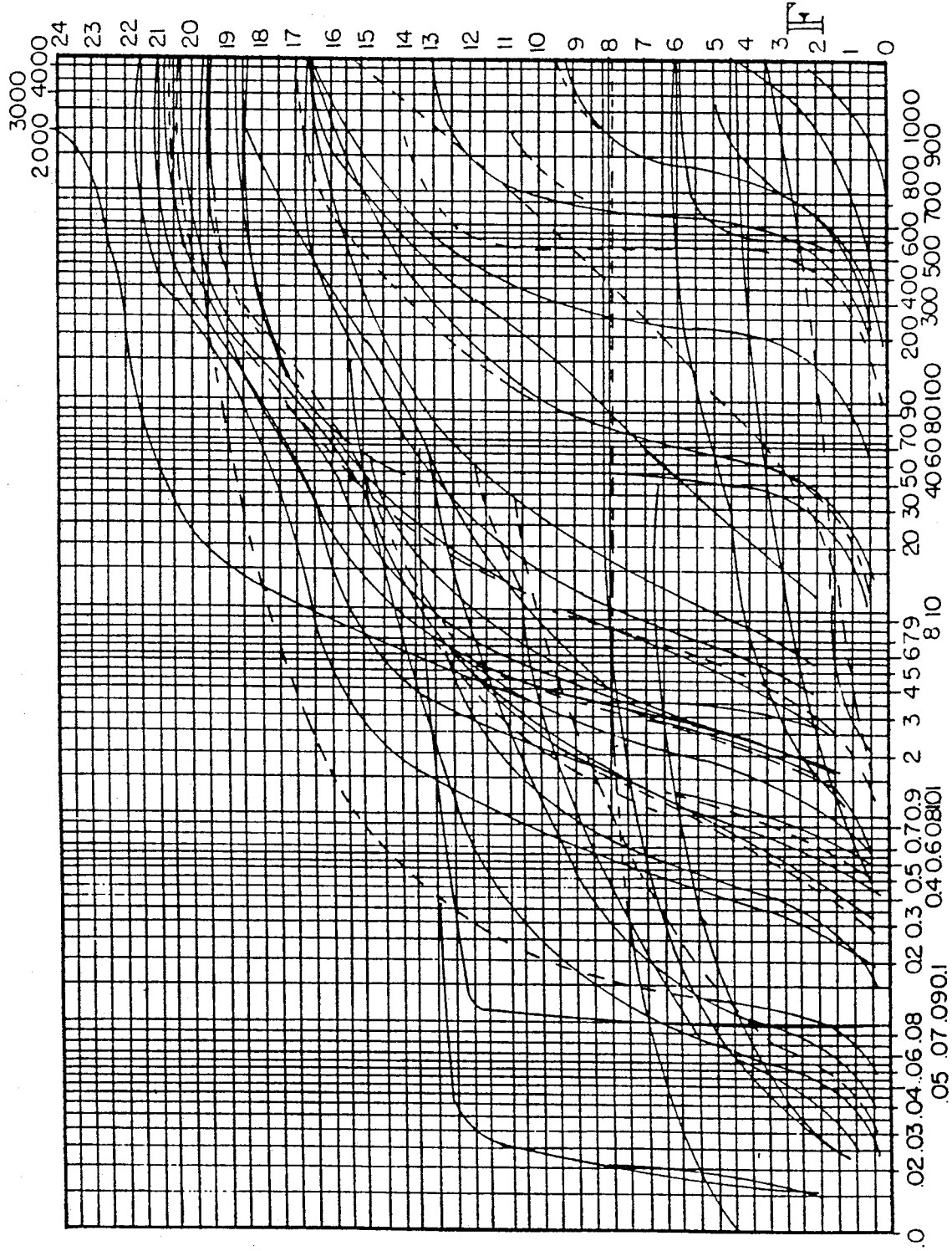
FIG. 2 is a graph of the intrinsic induction versus magnetizing forces for a wide variety of potential shimming materials.

FIG. 2 is a graph of the properties of many of the magnetic materials that can be chosen for use in making the shims 30. It is clear that there are a large number of suitable materials having varying strengths. This allows the tailoring of material choice to the expected magnetic (H) field on the shim. Throughout the remainder of this application it will be assumed that the shims will be made from a soft iron whose curve is designated by reference numeral 40 in FIG. 2. If desired, the strength of the shim 30 can be adjusted by either changing its thickness (t), in FIG. 1, or the material from which the shim is made.

Figure 3:
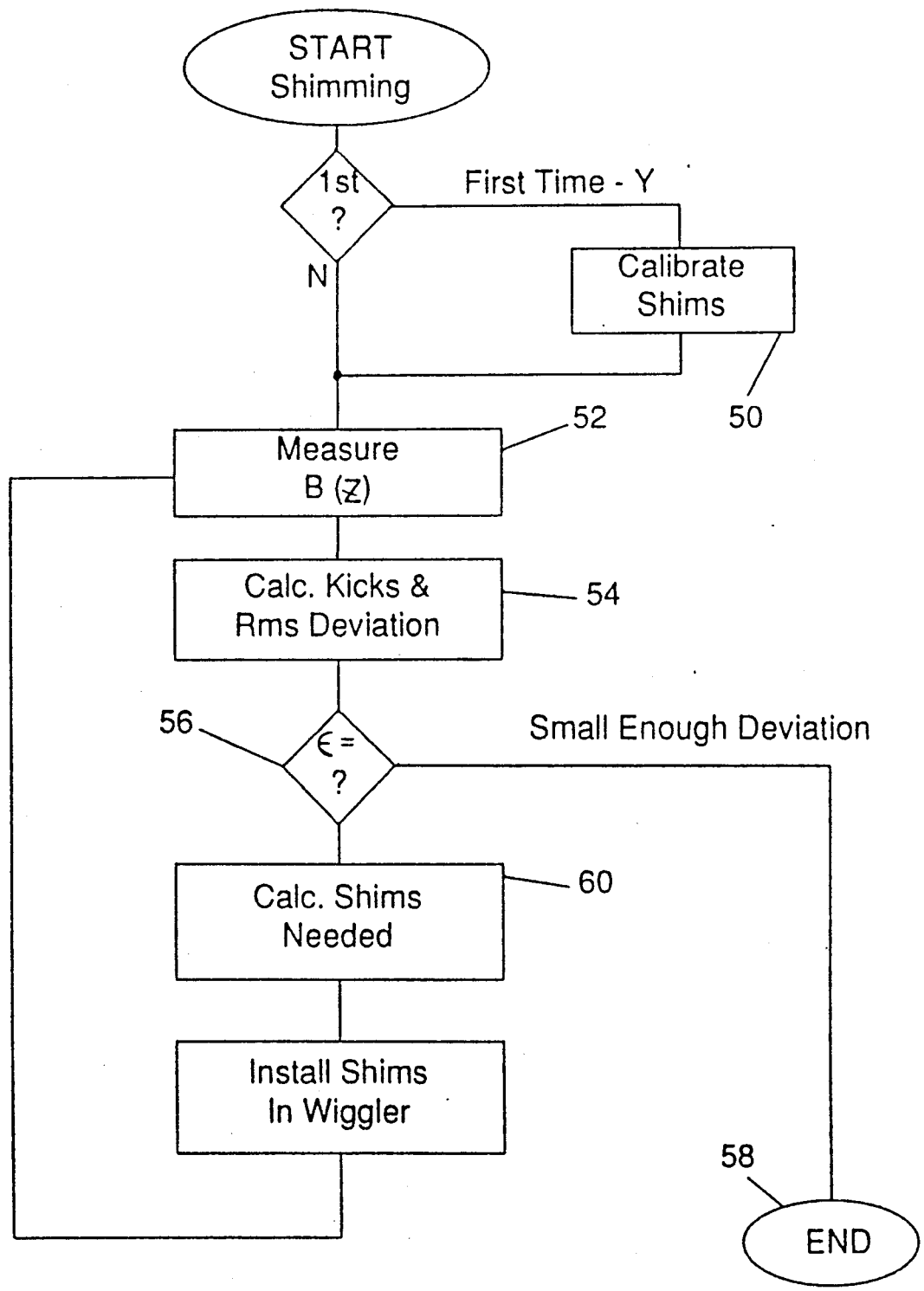
FIG. 3 is a block diagram showing the steps of the general method of the invention.

FIG. 3 is a block diagram of the general method of the present invention. The overall method of shimming consists of two major steps (1) calculating the effect of shims, and (2) calculating the shims needed to improve the wiggler. These two steps can be iterated if necessary. The amount of iteration required depends upon the desired error level. In turn, the error level depends upon the intended application. Currently, operating FELs and synchrotron sources require approximately 0.5 percent error in the wiggler magnetic field. Longer wigglers that have been proposed for higher power FELs would require 0.1 percent errors. I have achieved error levels using the present invention of less than 0.5 percent without requiring iteration on a test fixture using minimal quality control with respect to the shim material or fabrication. This was accomplished on a poor quality (1.5 percent errors) test fixture. It can be expected that errors of 0.5 percent can be accomplished without iteration on any wiggler presently being built. The iteration should be considered as a means of refining the field produced by the wiggler, not as a necessary step.

The method illustrated in FIG. 3 is fast, easy to implement, uses readily available materials, achieves its goals, is flexible, and does not require wiggler disassembly.

In the first pass through the method of improving a wiggler, as shown in FIG. 3, the shims 30 are calibrated in the shim calibration step 50. Next, in step 52, the B field is measured as a function of distance along the axis 26 to provide B(z). The magnetic field can be measured using conventional magnetic field probes. These measurements serve as a basis upon which the present invention will operate, but will not be used again. Next, the "kicks" and root mean square (RMS) deviation between the desired magnetic field and the achieved magnetic field are calculated in step 54.

In the example which follows, the RMS error of the half period kicks is minimized. Other applications might require minimization of a different quantity. An example might be the amplitude of lower spatial frequency errors. This is achieved with the present method by redefining the quantity which is minimized. Otherwise, the method is still applicable.

The integrated error between the desired and achieved fields are compared in step 56. If the errors are sufficiently small, a decision is made to end the method (step 58). Otherwise, the method proceeds and the size of the required shims are calculated in step 60. With this invention the field errors are too large for the initial conditions applied, so step 60 is always executed at least once. Finally, the calculated shims are installed in the wiggler 20 in step 62. The process is then reiterated starting at the measurement step 52.

Figure 4:
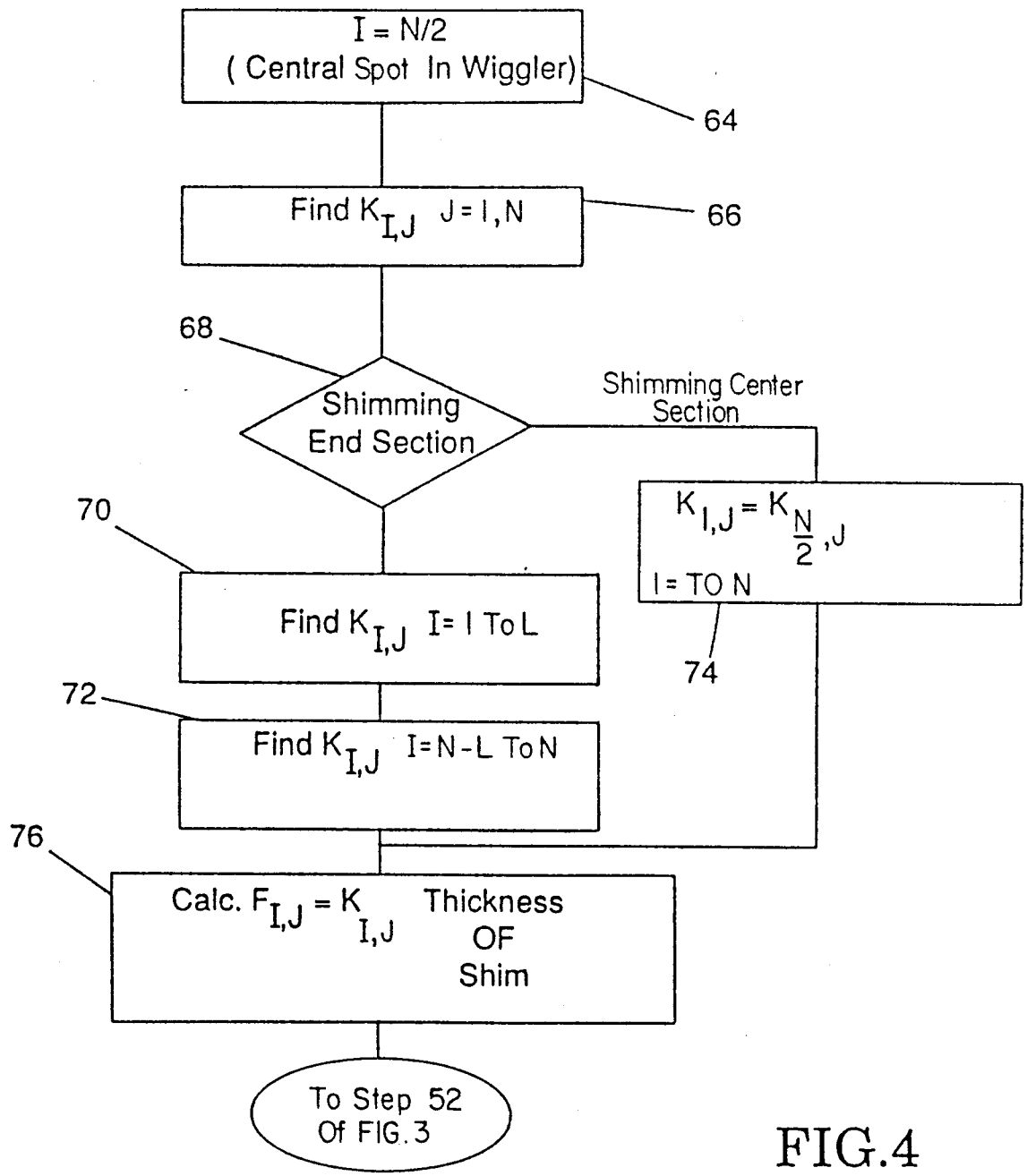
FIG. 4 is a block diagram showing the steps for calibrating the shims to be used to improve the existing wiggler of FIG. 1.

FIG. 4 is a more detailed illustration of the steps comprising the shim calibration step 50, as shown in FIG. 3. The central point in the wiggler 20 is located in the step 64. In practice, the "central point" is an operational definition. It is any magnet sufficiently far from the ends of the wiggler so that there are no "end effects" present in the shim field. My experience is that this is 5 magnets from the physical end of the wiggler. Next, the "kick" of each of the proposed shims is calculated in step 66. Then, the method determines whether the portion of the wiggler for which the shims are currently being calculated is the shim's end section, or a portion of its center section in decision step 68.

In the case that it is an end section that is being shimmed, (i.e., $j=1$ to L or $N-L$ to N), the kicks of the end section are determined in the step 70. Next, the kicks at the other end of the wiggler 20 are calculated in the step 72.

In the decision step 68 it was determined that the center section of the wiggler 20 was being considered, only a single signature is determined in the step 74. This central signature, $F(N/2,J)$, is shifted and used for all of the $F(I,J)$ in the central portion of the wiggler (i.e., $F(I,J)=F(N/2,J)$, $I=L+1$ to $N-L$).

Regardless of which of the two paths is taken from the decision block 68, the unit thickness $F(I,J)$ of the shim 30 is calculated in the step 76. Next, the previously described measurement step 52 in FIG. 3 is performed.

The shim calibration step 50, shown in FIG. 4, is performed once per type of shim (i.e., iron, nickel, oriented silicon, etc.). A field error of 0.1 percent was achieved with "off the shelf" steel shim stock. Therefore, exotic, hard-to-obtain materials are not required for use with the method of the present invention. The method described herein assumes linearity. This is certainly the case for the shims discussed above, as verified at a few thicknesses (see FIG. 5).

Figure 5:
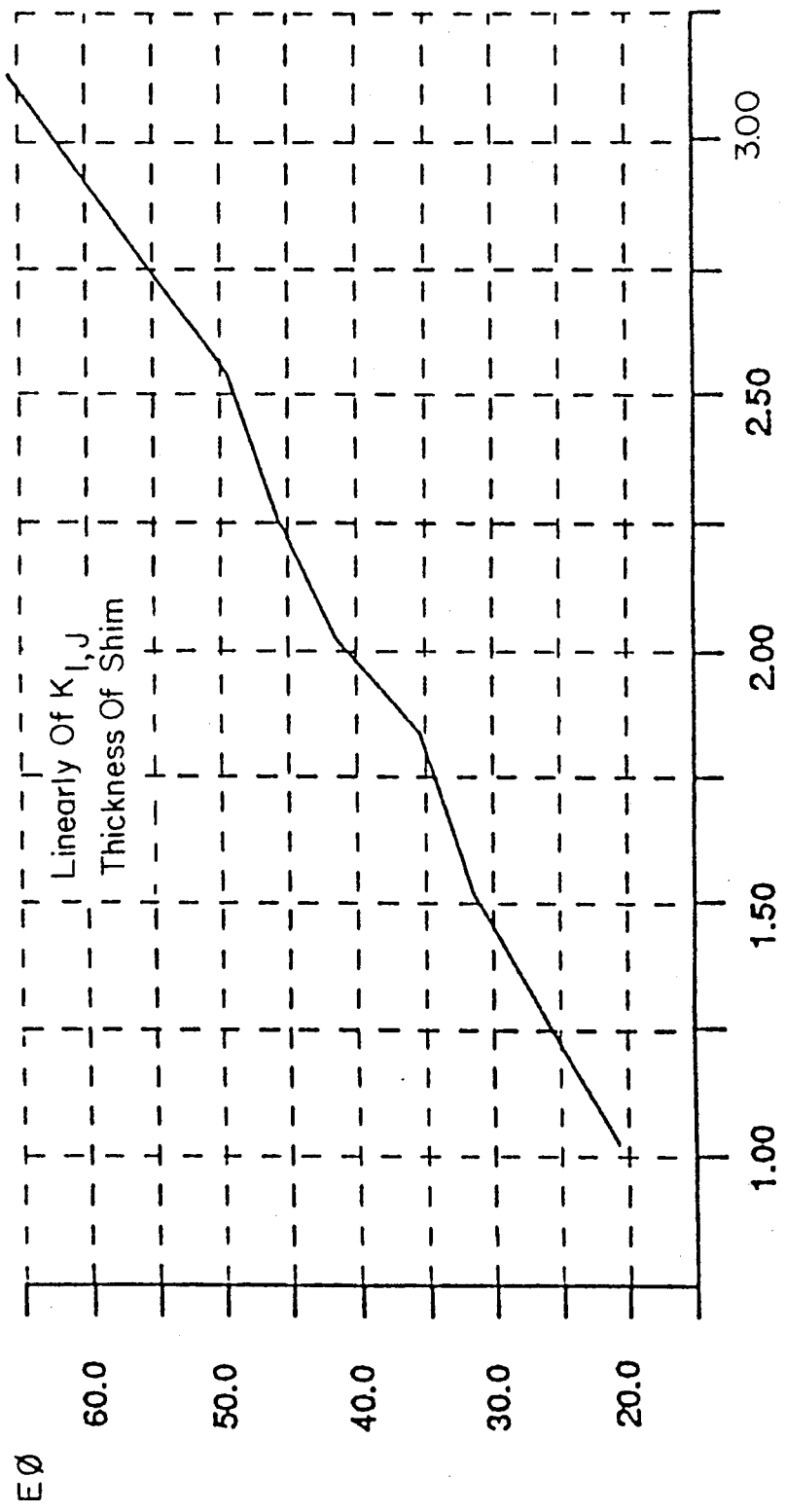
FIG. 5 is a graph of the linearity of the "kick" of a particular shim versus the thickness of the shim.

From a brief inspection of the graph of FIG. 5, it is clear that a kick of a typical shim is linear with respect to the thickness of a shim, although this is not a requirement for use with the method with the present invention. If the shim effects are nonlinear with material thickness, the effect can be measured and the method of the present invention easily adapted to account for the non-linearity.

An important refinement of the present invention is that the field of the end shims also be determined. A field of an end shim is not the same as that of a central shim because of the end effects on the wiggler.

Figure 6:
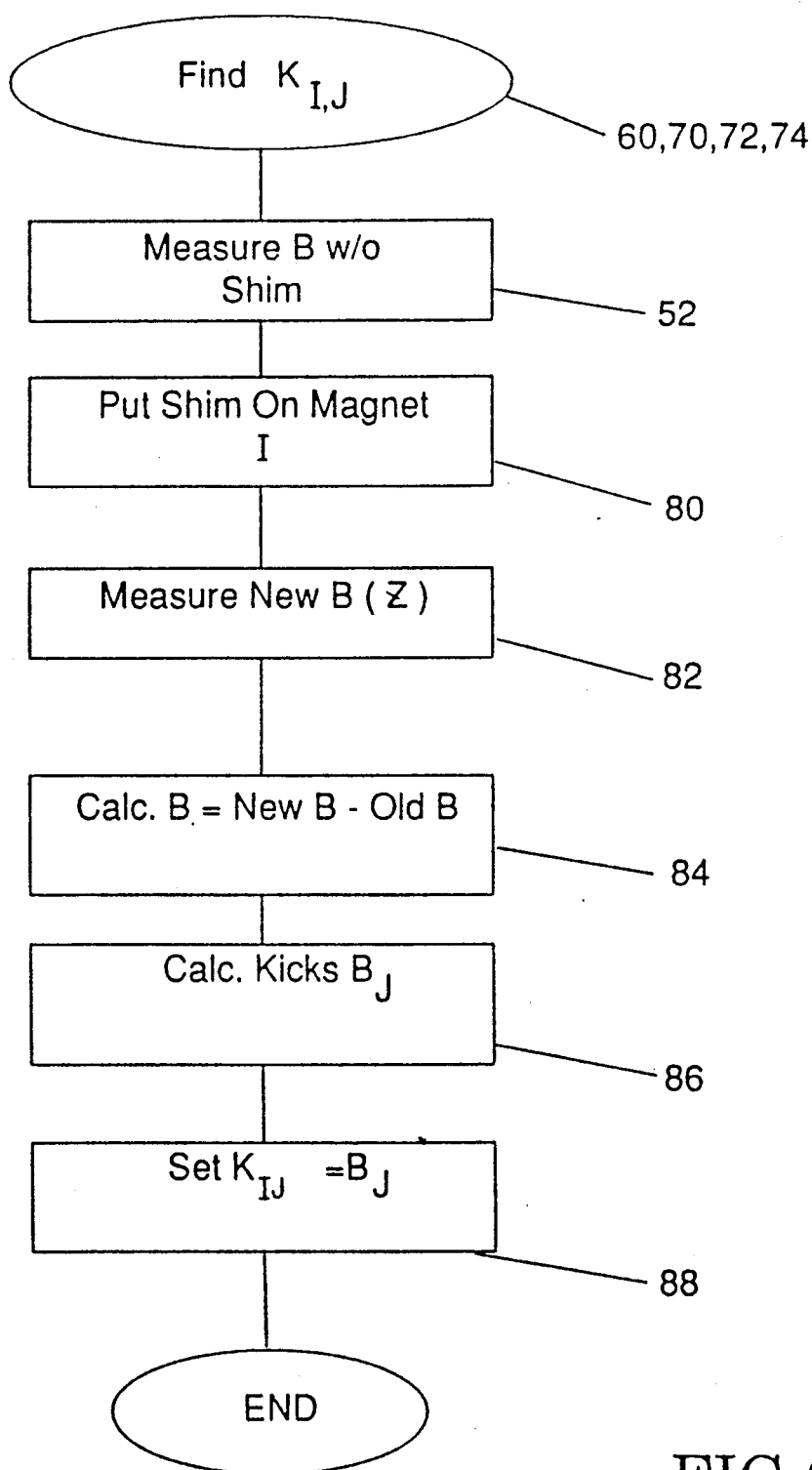
FIG. 6 is a block diagram showing the steps of a method for finding the values of the "kicks" of the calibration shim, according to the present invention.

A generic block diagram applying to the steps 64, 66, 70, 72, and 74, is shown in FIG. 6. First, the magnetic field along the axis 26 is measured in the step 52. Next, a shim is placed on a particular one (the Ith) magnet in the step 80. Again, the magnetic field is measured along the axis 26 in the step 82. The change in the fields are then determined as a function of position along the axis 26 in the step 84. From this, the kick of the Jth half period is calculated from the change in field in the step 86. Finally, the "kick" produced on the magnetic field at the Jth position by the change due to the Ith shim is set equal to $K_{IJ}$ in the step 88.

The kicks, $K_{I,J}$, are the half period integrated field change for a shim at the Ith position. The integral runs over half of a wavelength around the location of the Jth half period. The equation (equation no. 1) for the kick is $$K_{IJ} = \int_{Z_0 + (J-1)\lambda w/2}^{z_0 + J\lambda w/2} B^{(I)}_{shim}(z) dz \quad (1)$$

$$B^{(I)}_{shim}(Z) = B_{w/shim@Ithpole}(Z) - B_{w/oshim}(Z)$$

Figure 7:
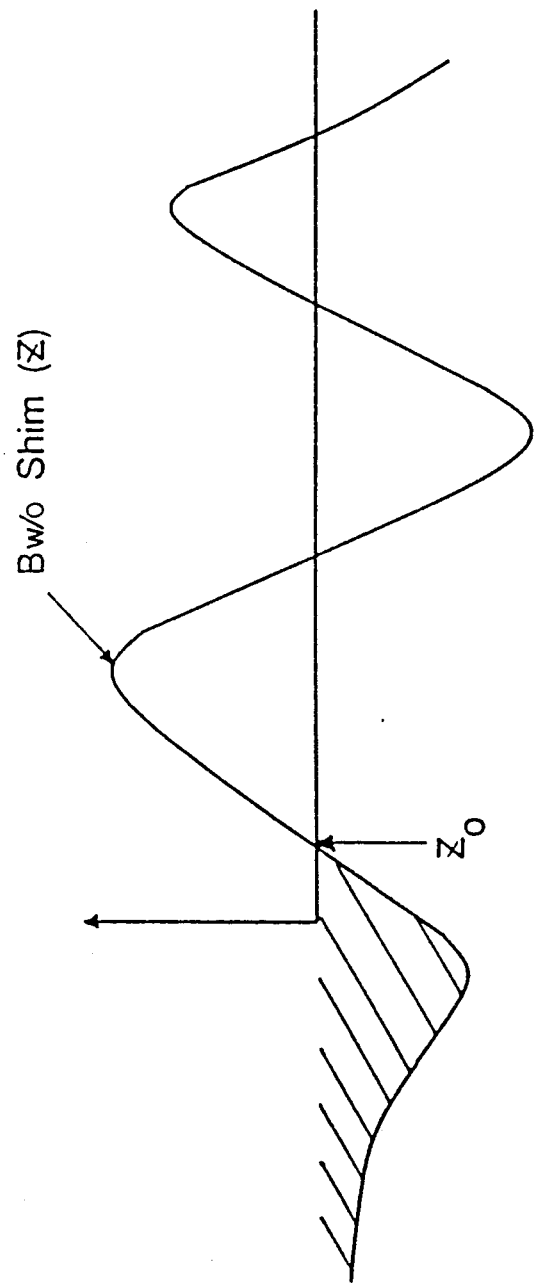
FIG. 7 is a graph depicting the definition of the initial point used in the determination of the B field for various segments of the wiggler.

The $Z_I$ is the position of the Ith zero crossing in the main magnetic field (see FIG. 7).

Figure 8:
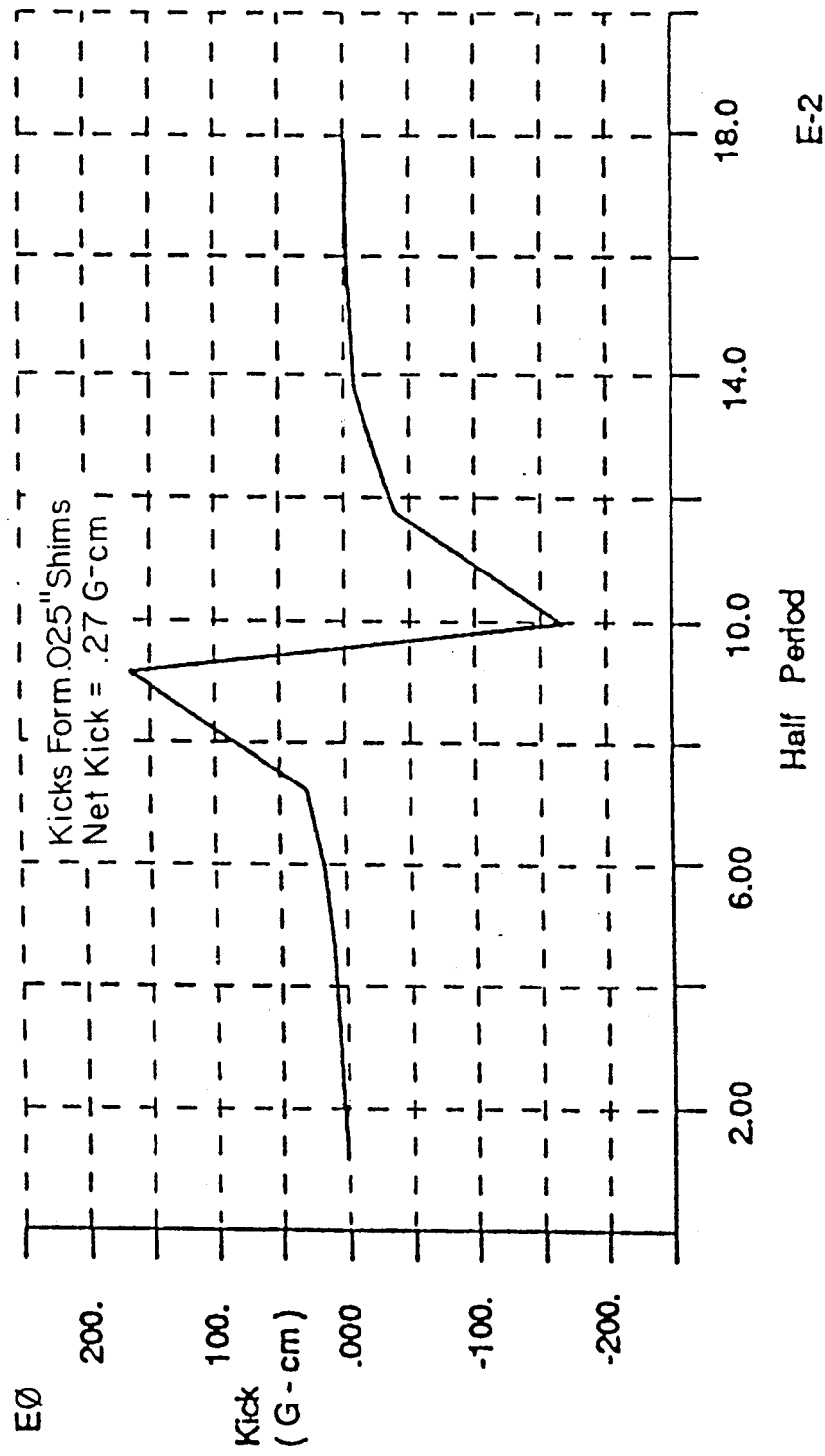
FIG. 8 is a graph depicting the form of the "kick" of a typical shim intended for use in performing the method of the present invention.

FIG. 8 illustrates the functional form of $K_{I,J}$, where the magnitude of the kick (in gauss-centimeters) is plotted as a function of half period number (for example from zero to 20). In the example shown in FIG. 8, the shim is 0.025 inch thick and provides a net kick of 0.27 gauss-centimeters and a peak kick of 170 gauss-centimeters. This is 3 percent of the maximum wiggler field and illustrates that this shim can produce significant corrections.

Figure 9:
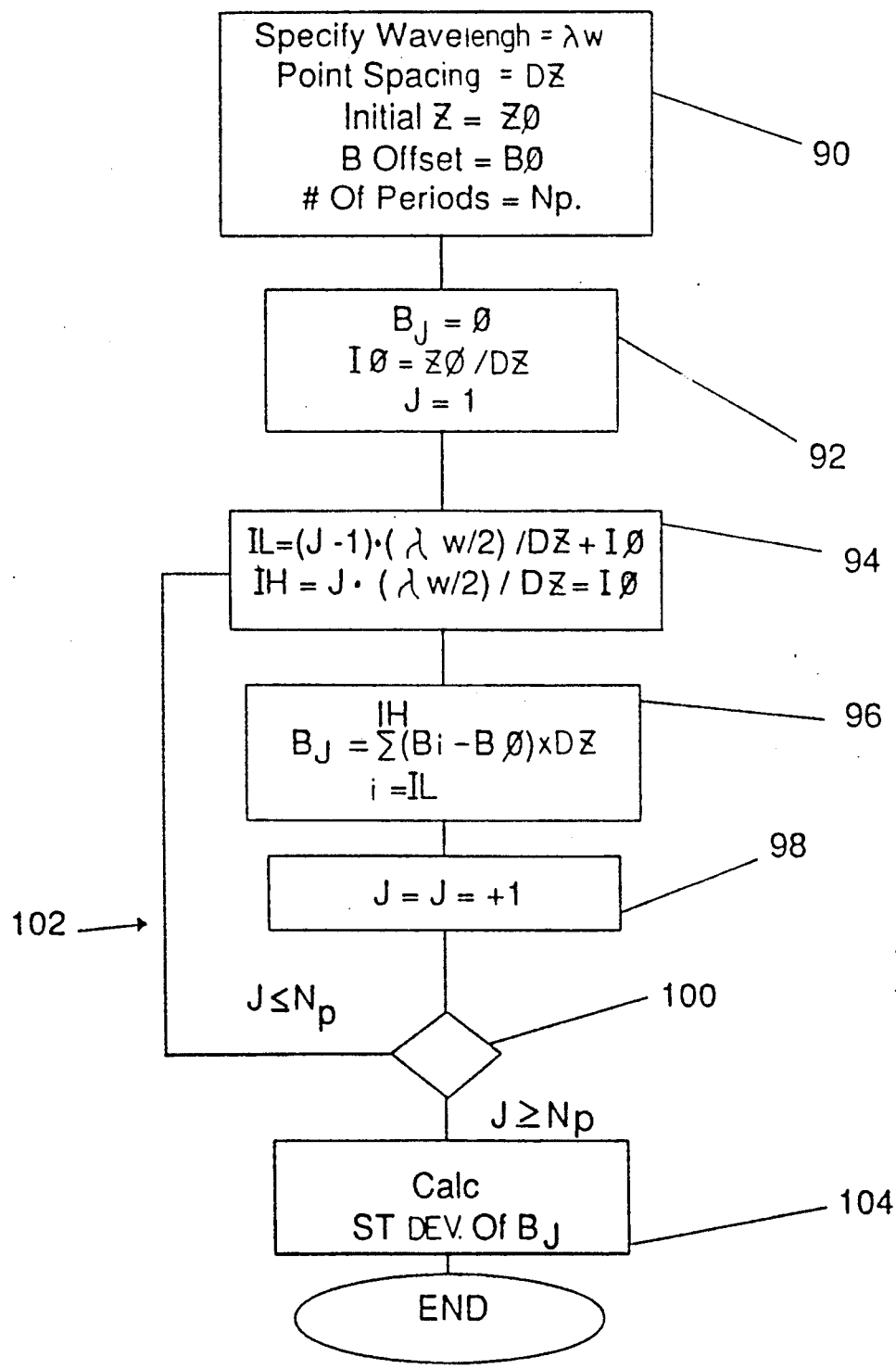
FIG. 9 is a block diagram showing the steps of a method for calculating the "kicks" and the deviations introduced by a particular shim, according to the present invention.

FIG. 9 is a more detailed illustration of the calculation steps comprising the step 54 of FIG. 3, for calculating the kicks and RMS deviations. The calculations specified in step 90 are to determine the field integral errors (B(J)). The other parameters specified in the step 90 will usually be the same as used in the previous pass through step 54 and are set equal to the number of poles in the wiggler 10. The step 92 is a further specification of variables needed in the step 54. The steps 94, 96, 98, and 100 establish the iterative loop 102 which calculates the integral shown in the previous equations. The iterative loop 102 is exited when the value of J exceeds or equals the number of poles (N) in the wiggler. A standard statistical calculation of a standard deviation of the $B_J$,s calculated in step 96 is next performed in the step 104.

Figure 10:
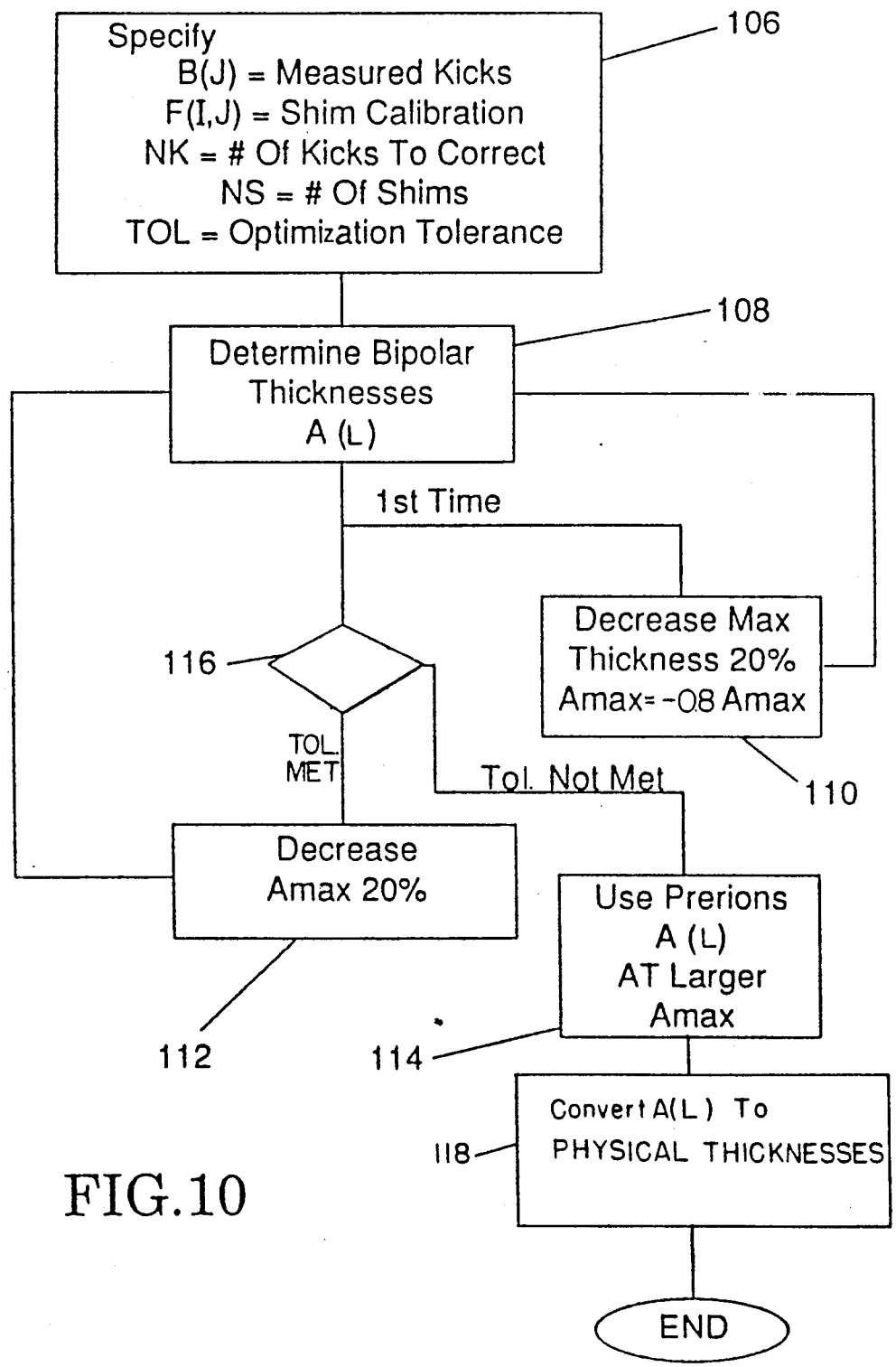
FIG. 10 is a block diagram of a method for calculating the thickness of each desired shim.

Referring now to FIG. 10, a more detailed illustration is provided of the steps comprising the calculation step 60 of FIG. 3. The tolerance of the calculation is an important parameter. It reflects how much uncertainty there is in the value of the kicks and the calibration. For example, if the uncertainty in the kicks is 5 gauss- centimeters, then a tolerance less than 5 gauss-centimeters is meaningless since it is less than the measurement error. In step 108, it can be seen that bipolar thicknesses can be negative. This is needed mathematically but is a physical impossibility. Subsequent steps in the method can be used to correct this mathematical trick. If a constant is added to the mathematical shim thickness, then the field will be lowered slightly in amplitude. Mathematically, this can be stated by equations Nos. 2 and 3 as follows:

$$\text{if } B(z) = A \sin \frac{2\pi z}{\lambda w}, \text{ and} \quad (2)$$

$$\text{then } F(z) = \sum_{L=n1}^{n} A(L) B_{shim}(z - zi) \text{ then} \quad (3)$$

$F(z)$ " $B(z)$, where $A(L)$ = constant $F(z)$ " $B(z)$, where
$A(L)$ = constant
Since $F(z)$ is the field from the set of uniform thickness shims, the only effect of adding a constant to the shim thickness is to lower the amplitude of the main wiggler field. In practice, it is necessary to calculate the kicks due to equation 2 using equation 1, and then use the shimming method to gain a more accurate estimate of the A(L). This step of refining the A(L) is only needed when there are end effects. At the center portion of the wiggler, A(L) are constant.

Another approach, used prior to initial shimming, is to preload the wiggler with a shim of the same thickness, denoted as $t_0$, calculate the bipolar thickness A(L), then replace the shims with new shims of thickness $A(L) + t_0$. The negative A(L) will then designate a shim with a thickness less than $t_0$. Of course, $t_0$ must be large enough that $t_0 + A(L)$ is greater than zero for all shims.

A third approach is to restate the optimization so that the steering A(O), shim thicknesses, A(L) and the sine wave amplitude, A, are all adjusted to minimize the errors. In this approach, the shim thicknesses are all positive.

We have used all three approaches and found them to be equivalent.

The quantity AMAX (see steps 110, 112, and 114) is half the maximum shim thickness. For example, in the preload approach, it is required that AMAX is less than or equal to $t_0$. Unless the tolerance is zero, there are combinations of thicknesses which meet the tolerance. By reducing AMAX, we decrease the maximum thickness without affecting field quality. Also, by decreasing AMAX, the possible range of shim thicknesses is reduced so that the shim field will not be required to balance precisely. This reduces the sensitivity of the present method to variability in shim material Two iterative loops leave from the step 108. After the first departure from the step 108, the maximum thickness (AMAX) is decreased by twenty percent. A decision is made in the step 116, and if the tolerance is not met, the method uses the previous value of bipolar thickness (A(L)) at the larger AMAX as shown in the step 114. In this case, the A(L) is converted to a physical thickness by one of the three approaches discussed above. This occurs at step 118. Finally, the thickness is calculated in step 120.

Figure 11:
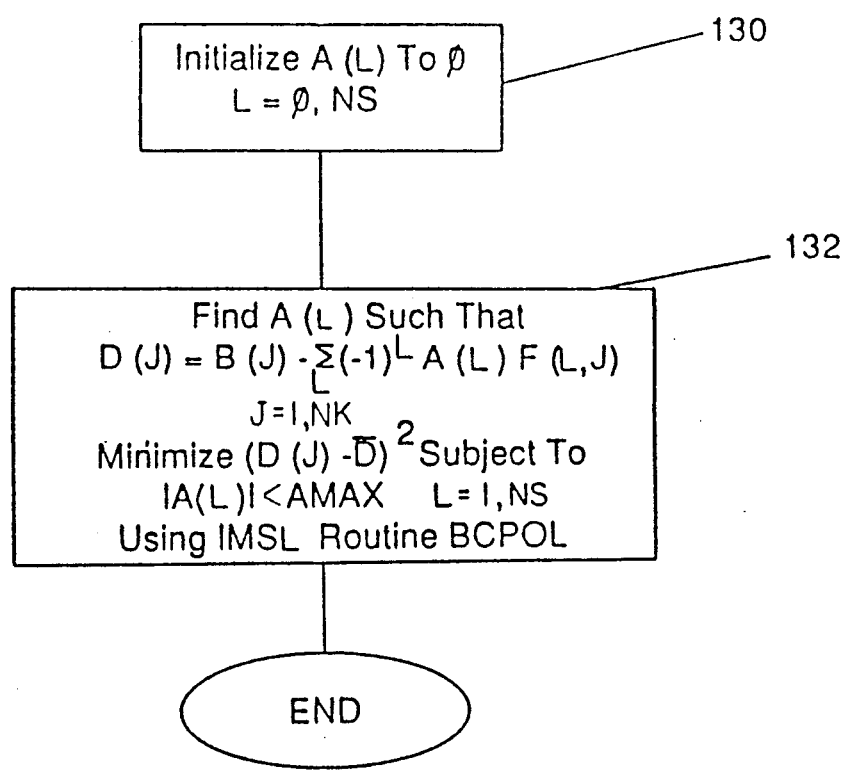
FIG. 11 is a block diagram showing the steps for determining a bipolar "thickness" of a shim, according to the present invention.

FIG. 11 illustrates in more detail the steps comprising the step 108 in FIG. 10. In wigglers for FELS, the quantity of interest is the phase, which is $$\phi(z) \propto \int_o^z B^2(z') dz'$$

If the B(z) were perfect, then $$\Phi(z) = \int_o^z B_o^2(z') dz'$$

$$B_0(z) - B_0 \sin 2\pi z/\lambda w$$

The correct quantity to minimize in this situation is
t mean square (RMS) deviation of $\phi(z)$ about $\Phi(z)$ over the length of the wiggler 10. Since $\Phi(z)$ depends on the integral of $B^2(z)$, a general optimizer has been designed to allow for flexibility in determining the target field. In the present example, the minimum RMS kick error is used as the figure of merit. Clearly, improving this will improve the phase error which results. It should be stressed that the choice of the figure of merit is dictated by the intended application. The shimming method is general enough to permit this choice.

As shown in the step 130 of FIG. 11, the bipolar thicknesses are initialized to zero. Subsequently, a computation for determining the $A_L$ is shown in the step 132, which is stated as a mathematical optimization problem that can be solved by a mathematical routine available from IMSL, named BCPOL. This problem is to maximize a squared figure of merit subject to upper and lower bound constraints on the variable interest.

An important part of the invention is the inclusion of a steering correction, denoted as $A(\phi)$ in 132. This is needed because the RMS kick error will usually have a steering component. As noted in FIG. 8, the shims do not steer the e-beam since their integral is zero, thus the optimizer must include a steering correction.

Figure 12:
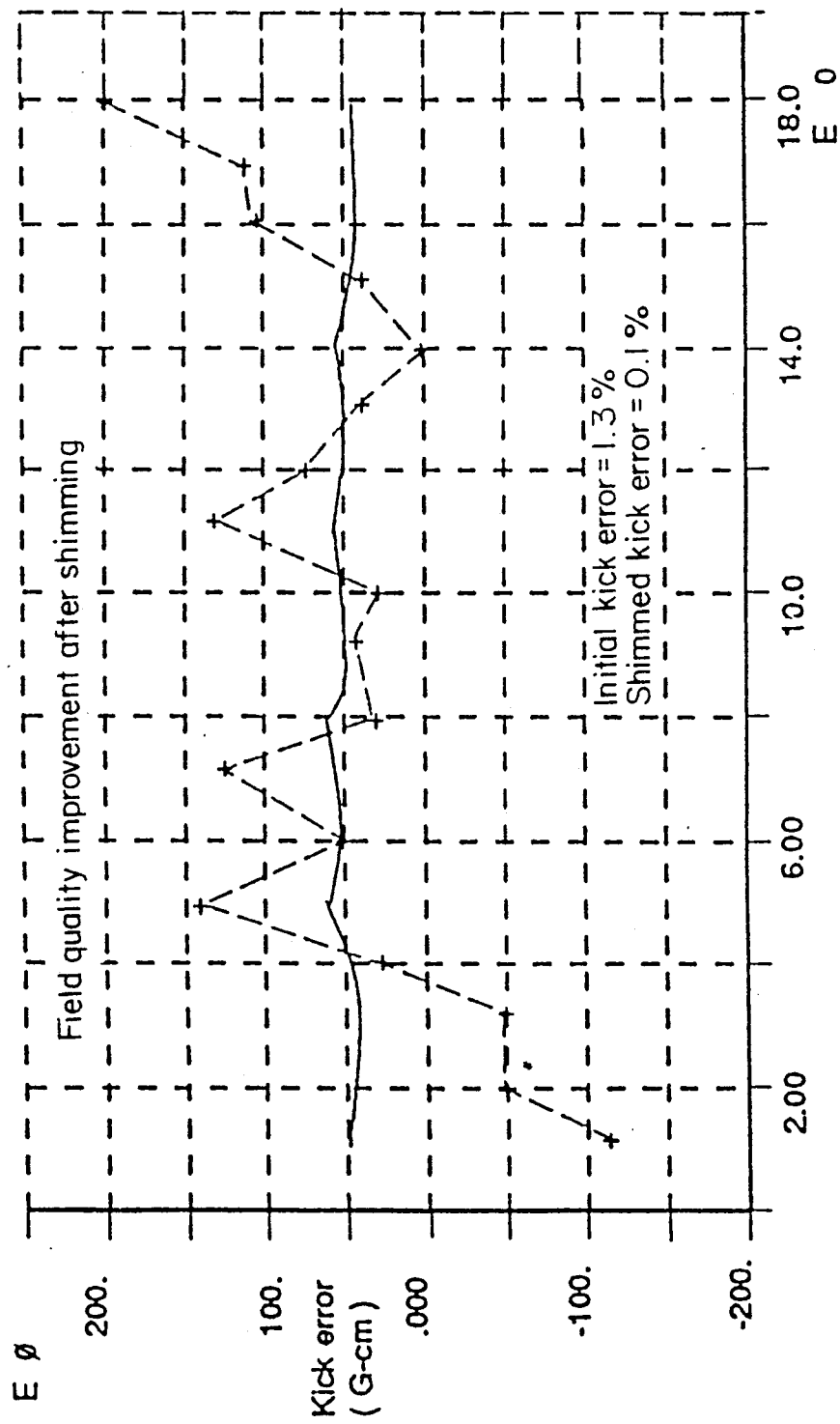
FIG. 12 is a graph of field quality versus half period number of a typical wiggler that has been improved according to the method of the invention.

FIG. 12 illustrates the significant benefits to be obtained by applying the method of the present invention to a wiggler. As shown, before shimming, the kick error was 1.3 percent. After shimming, the kick error was reduced to 0.1 percent.

Figure 13:
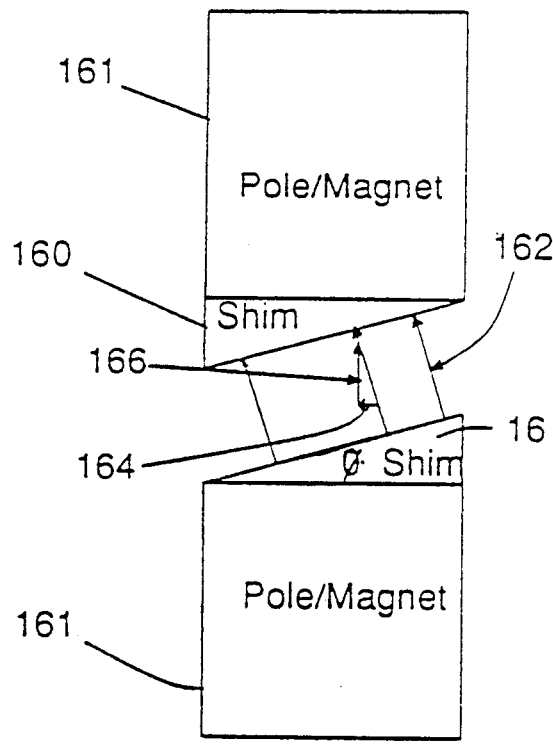
FIG. 13 is a diagram of a first wiggler structure for correcting transverse steering.

FIG. 13 is a diagram of a first wiggler structure for correcting transverse steering. The structure uses wedge-shaped shims 160, having a wedge angle theta in the transverse direction, which are placed on the pole/magnet structures 161 to rotate or cant the local coordinate system of the wiggler. The two shims 160 rotate the coordinate system in the same direction. The new magnetic field 162 is a rotated version of the magnetic field (not shown) which would be produced by the wiggler in the absence of the wedge-shaped shims 160. The new magnetic field 162, of strength B, has a transverse component 164 of strength B*sin(theta), and a remaining main component 166 of strength B*cos(theta).

As long as theta is small, this structure will only slightly change the main component 166 of the magnetic field and yet a large effect on the transverse component 164. Each millirad of wedge angle theta produces about 10 G-cm of transverse kick. When the shims 160 are placed on pole/magnets 161, they change the local gap, so there will necessarily be a steering component to the effect produced by this shape of shim. This steering can be removed by other shims (not shown), or the pole/magnets 161 can be preloaded with a fixed thickness of shim. Wedges placed on magnets would not change the local gap so they might be preferable.

In order to achieve a transverse field with a nonzero line integral the wedges 160 should not have an alternating angle. An alternating angle would be equivalent to rotating the coordinate system first in one direction then in the other direction as one passes along the wiggler axis, which would give a zero net rotation.

Figure 14:
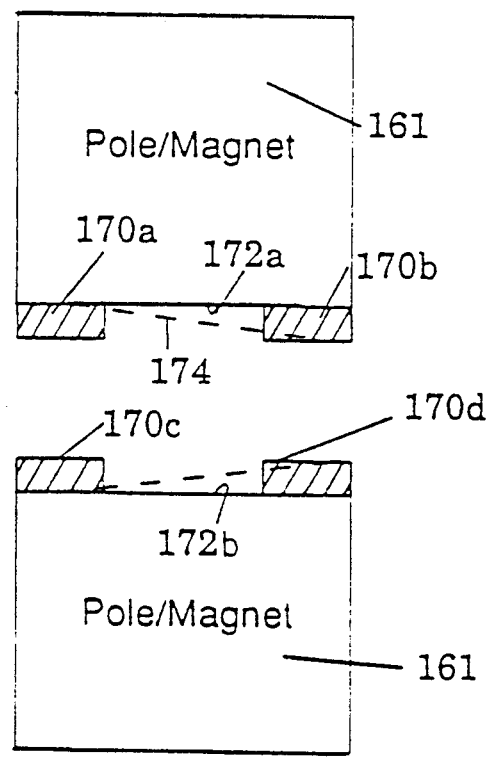
FIG. 14 is a diagram of a second wiggler structure for correcting transverse steering.

In practice, it may not be easy to produce small wedge angles. FIG. 14 is a diagram of a second wiggler structure for correcting transverse steering. The shims 170a–d are placed along the surfaces 172a–b of the respective pole/magnets 161. The purpose of shims 170a and 170b, placed along the surface 172a of a pole/magnet 161, is to approximate the effect of a single wedged-shaped shim (as shown by the dashed line 174a). Each of the shims 170a–d have rectangular cross-sections, and thicknesses and widths appropriate to cause the desired approximation to a single wedged-shaped shim. The transverse placement and separation of the two shims placed on a pole/magnet 161 can also be varied in order to achieve the desired transverse steering. As further shown in FIG. 14, a desired transverse steering can also be achieved by causing the effects of the first pair of shims 170a–b to be canted in an opposing direction to the direction of cant of the shims 170c–d.

The structure shown in FIG. 14 may produce additional higher order moments which would have to be measured and compensated for in an extension of the algorithm already described for shims placed on magnets. In general, all shaped shims will produce additional moments which should be measured and compensated during shimming. The choice of shapes will always involve a trade-off between an easy to fabricate shape such as is shown in FIG. 14, and a high field quality shape which is more difficult to fabricate, such as is shown in FIG. 13. Those skilled in the art will realize that this tradeoff must be made based on experience and the desired field quality.

Figure 15A:
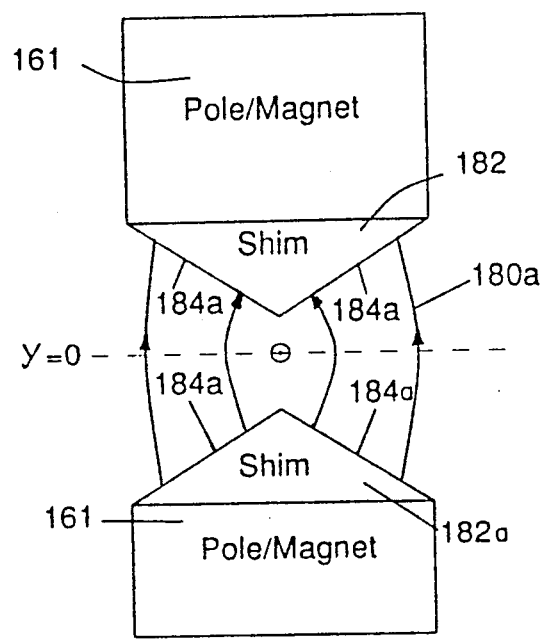
FIGS. 15A–C are diagrams of alternative shim shapes for correcting steering in a $(x^2 - y^2)$ sextupole.
Figure 15B:
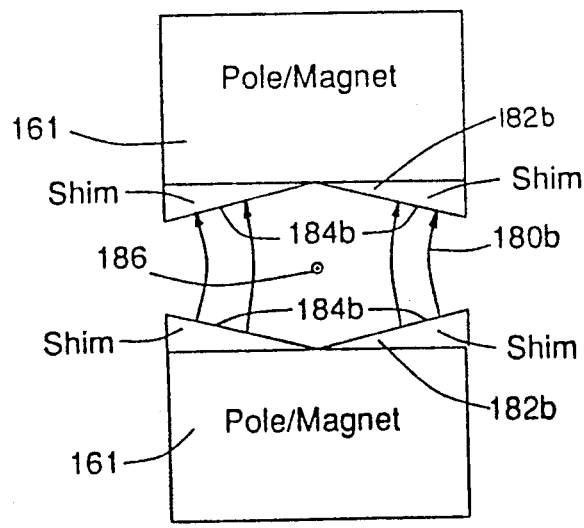
Figure 15C:
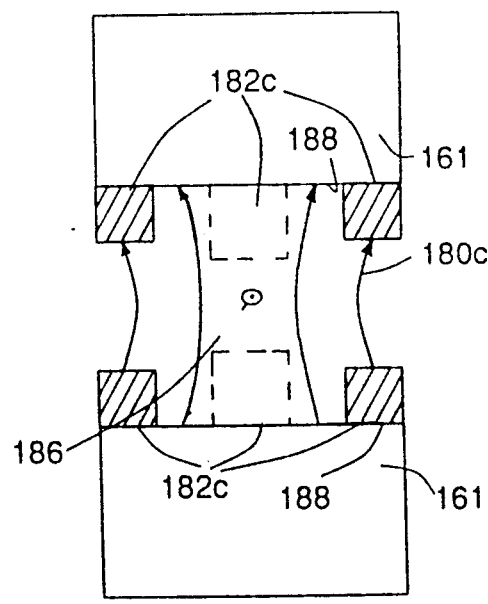

FIGS. 15A–C are diagrams of alternative shim shapes for correcting steering in a particular sextupolar field with the main field obeying an $(x^2-y^2)$ transverse spatial dependence and having an $(xy)$ transverse field. The approximate field lines 180a, 180b and 180c are respectively shown in FIGS. 15A, 15B, and 15C, assuming that the pole/magnets 161 have an infinite permeability. FIG. 15A shows the effect of shims 182a, which each have wedged faces 184a directed away from one another. The shims 182a produce a field 180a which is transversely displaced outwardly from the longitudinal axis 186 of the wiggler. FIG. 15B shows the effect of shims 182b, which each have wedged faces 184b directed toward one another. The shims 182b, which can each be made from two wedged-shaped shims or from an integral shim, produce a field 180b which is transversely displaced inwardly toward the longitudinal axis 186 of the wiggler. FIG. 15C shows an approximation to the shim configuration of FIG. 15B, wherein rectangular shims 182c (having both positive and negative thicknesses) are aligned along the surfaces 188 of the pole/magnets 161.

There is another way to produce linear and steering corrections with these sextupolar shims. It is accomplished by placing shims of different strengths on two longitudinally neighboring poles and shifting the (x,y) origins of the shims, then the total field will be a linear combination of shifted and scaled sextupoles. This can also be used to correct the lower order moments as well as the sextupole. If shims are placed on magnets the detailed field shape would change, but similar shaping could be used to create this sextupole.

The other orientation of sextupole has a transverse field of the form $(x^2-y^2)$ which is more difficult to modify by pole shaping due to the strong tendency of all the flux to flow across the magnetic gap. The pole face shape that would produce this sextupole would satisfy the equation:

$$I_3(kw\rho)\cos 3\phi = \text{constant}$$

$$kw = 2\pi/\lambda w$$

$$\rho = \sqrt{x^2 - y^2}$$

$$\phi = \tan^{-1}(y/x)$$

$I_n(z)$ = modified Bessel/function of order n This expression is based on a Fourier-Bessel expansion of the magnetic scalar potential. In cylindrical coordinates the potential is:

$$\Phi = \sum_{m=1}^{\infty} \rho^m e^{im\phi} A_m + \sum_{l=1}^{\infty} \sum_{m=1}^{\infty} B_{lm} I_m(lk_w \rho) e^{im\phi} e^{ilk_w z}$$

$$B = \vec{\nabla} \phi$$

The magnetic field near $\rho=0$ follows the expected multipole shape. The A(n) represent fields with zero error when integrated along the electron trajectory, and the B(l,m) represent fields with zero line integrals and non-zero trajectory error. The pole shape is found by setting the magnetic potential of the $l=1$, $m=3$ term to a constant at the pole surface when $\cos(k_w*z)=1$. This is a reasonable approximation when the poles have a large permeability as they do in a wiggler. The pole shape expression cannot be satisfied when $\cos(3*\phi)=0$. Thus, no iron is placed at $30 \pm k*60$ degrees. From the general potential expression, the other sextupole (transverse field xy) is created when:

$$I_3(k_w \rho) \sin 3\phi = \text{constant}$$

Figure 16A:
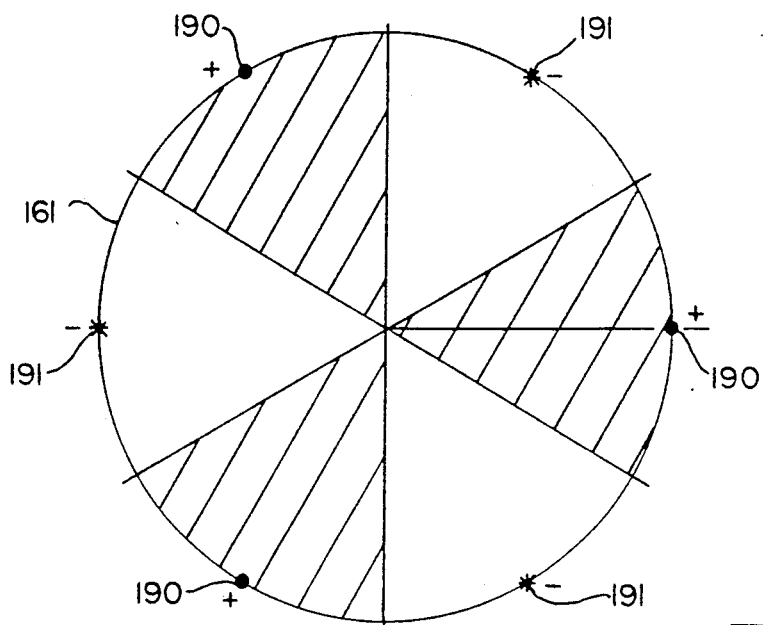
FIGS. 16A–B are diagrams of steps in a method for placing shims in a wiggler structure for correcting steering in a $(x^2 - y^2)$ sextupole.
Figure 16B:
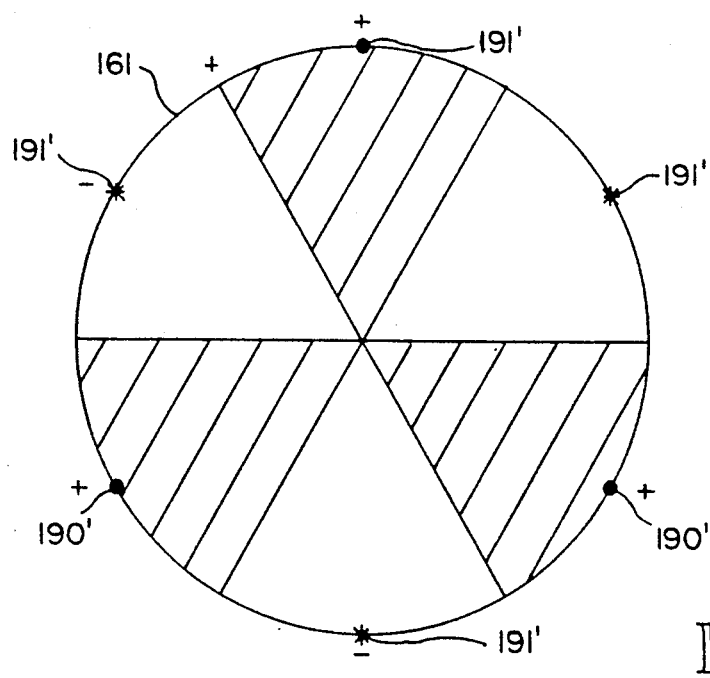

The only difference between the two sextupoles is a replacement of a cosine by a sine. This is expected since the two sextupoles are orthogonal to each other. When we move over one pole, the $\cos(k_w*z)$ changes sign so an identical placement of iron would produce the opposite sign of correction producing a sextupole whose line integral is zero, but whose trajectory integral is non-zero. The iron placements are illustrated in FIGS. 16A and 16B. To produce a nonzero line integral, the iron placement on the neighboring pole would have to compensate this sign reversal. We can illustrate, in FIG. 16A, how this would be achieved by imagining iron placed at $\cos(3*\phi)=1$, i.e., at points 190 which are located at 0, 120, 240 degrees on the first pole/magnet 161. If the same amount of iron is placed at positions 191, where $\cos(3*\phi)=1$., i.e., at 60, 180, 300 degrees, then we would get a sextupole which had a nonzero line integral. By taking linear combinations of these two placements on the poles, we can achieve both lineintegral and trajectory integral control of the sextupole part of the field. Finally, by doing the same thing at the other orientation (see FIG. 16B) we see that by using 90-degree rotations to locate points 190' and 191', corresponding, respectively, to points 190 and 191, pole-to-pole symmetry/asymmetry and various amounts of iron, that we can control the trajectory and line integrals of both sextupole components.

The above description can be applied to other moments by simply replacing $\cos(3*\phi)$ by $\cos(m*\phi)$ or $\sin(3*\phi)$ by $\sin(m*\phi)$. Thus, we see that by placing shims at various angular positions on a circle we can control the higher order moments. In addition, if the shims cannot be placed at the same radius due to fabrication limitations of the wiggler, the amount of iron used at the desired angle can be found by solving:

$$\frac{\text{const}}{I_m(lk_w \rho_{iron})} = B_{lm}$$

The leading dependence of this Bessel function is like $\rho m$. This implies that distant iron will have to be stronger than close iron with a well-defined radius scaling. Those skilled in the art will realize that this method allows a general prescription for determining the placements and amounts of iron needed for correcting higher order moment errors. In particular, cylindrical placement of iron is not needed.

Figure 17A:
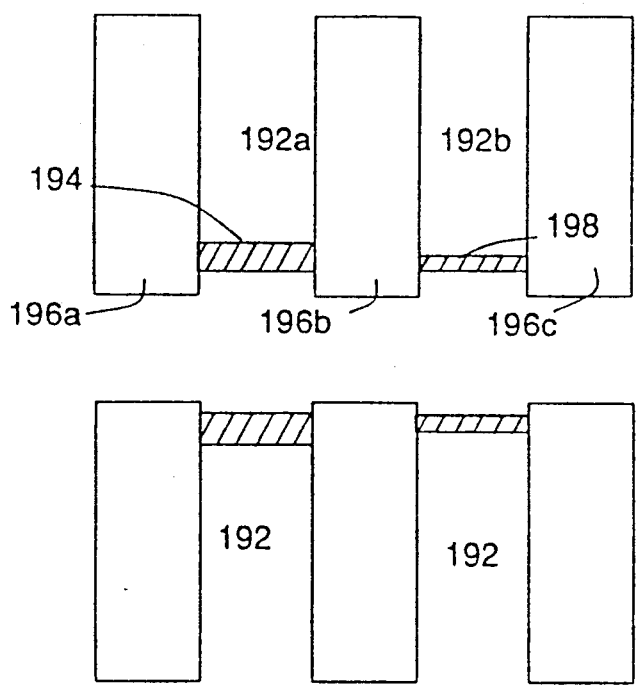
FIG. 17A is a diagram of a wiggler corrected for higher order moments using iron magnets.
Figure 17B:
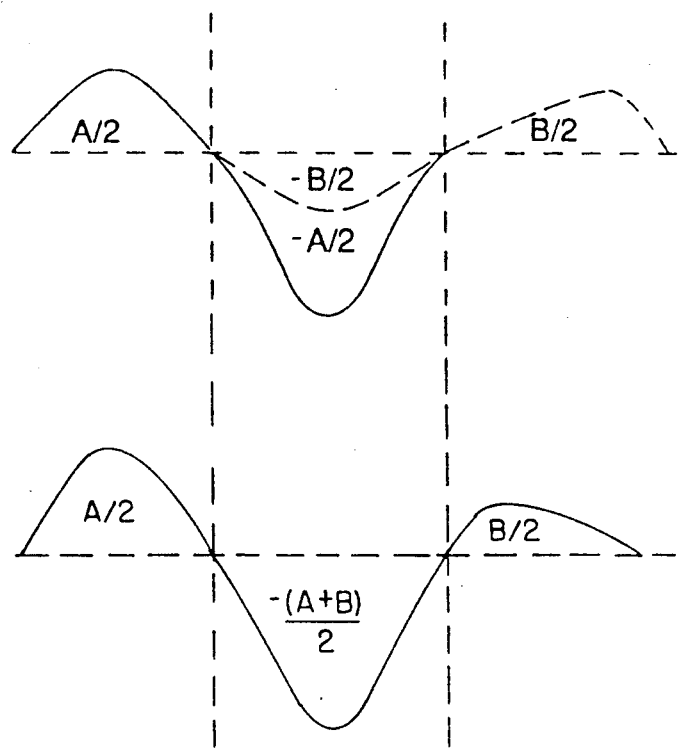
FIG. 17B is a diagram illustrating the change in the magnetic field of a wiggler having higher order moments that have been corrected by a method of the present invention, using iron magnets.

The above description can be applied to controlling high order moments by using pole shims The shims can also be placed on magnets 192. as shown in FIG. 17. If a shim 194 of moment strength A is placed on magnet 192a, then we can think of its field as being equally shared by pole 196a and pole 196b, assigning 0.5A to pole 196a and $-0.5$A to pole 196b. If a shim 198 of strength B is placed on magnet 192b then we expect $-0.5$B at pole 196b and 0.5B at pole 196c. The net effect is 0.5A at pole 196a, $-0.5$(A+B) at pole 196b, and 0.5B at pole 196c.

While the foregoing discussion has been directed to the preferred embodiment of the present invention, those skilled in the art will recognize that various modifications of the method can be made without departing from the spirit and scope of the present invention. An example is the explicit control of phase errors in an FEL. The embodiment which has been described in the foregoing minimizes root mean square (RMS) field errors. When this is achieved, phase errors are implicitly improved. Instead, however, it could be chosen to control the phase at the outset. as will be understood by those skilled in the art of wiggler design. Therefore, the spirit and scope of the present invention are to be limited only by the following claims.

I claim:

1. A method for producing an N-pole wiggler by modifying an existing N-pole wiggler, the modified N-pole wiggler having a desired longitudinal magnetic field, comprising the steps of:
    (a) measuring the individual effect on the magnetic field of the existing N-pole wiggler of adding an individual shim of known thickness to a first of the N pole pieces of the existing N-pole wiggler;
    (b) measuring the individual effects on the magnetic field of the existing N-pole wiggler of separately adding individual shims of known thickness to each of the remaining N pole pieces of the existing N-pole wiggler;
    (c) computing the effect on the magnetic field of the existing N-pole wiggler of modifying the existing N-pole wiggler by simultaneously adding all of the shims to the corresponding N pole pieces of the wiggler;
    (d) adjusting the thicknesses of the individual shims to minimize the difference between the magnetic field of the desired wiggler and the actual magnetic field of the modified wiggler; and
    (e) adding shims having the desired thickness to the existing wiggler.

2. The method of claim 1 wherein steps (a) and (b) further comprise measuring the effect of adding an individual shim is measured as the root mean square error between the magnetic field which results from adding the individual shim and the desired magnetic field.

3. The method of claim 1 wherein step (c) further comprises computing the cumulative effect of each individual shim on the magnetic field of the existing N-pole wiggler.

4. The method of claim 1 wherein step (d) further comprises minimizing the root mean square (RMS) of the difference.

5. A method for producing an N-pole wiggler by modifying an existing N-pole wiggler, the modified N-pole wiggler having a desired magnetic field, comprising the steps of:
- (a) measuring the individual effect on the magnetic field of the existing N-pole wiggler of adding an individual shim of known thickness to a first of the N pole pieces of the existing N-pole wiggler;
- (b) measuring the individual effects on the magnetic field of the existing N-pole wiggler of separately adding individual shims of known thickness to each of the remaining N pole pieces of the existing N-pole wiggler;
- (c) computing the effect on the magnetic field of the existing N-pole wiggler of modifying the existing N-pole wiggler by simultaneously adding all of the shims to the corresponding N pole pieces of the wiggler;
- (d) adjusting the thicknesses of the individual shims to minimize the difference between the magnetic field of the desired wiggler and the actual magnetic field of the modified wiggler; and
- (e) adding shims of desired shape to the existing wiggler to control transverse, axial and higher order moment fields.

* * * * *